United States Patent
Wilcoxon

(10) Patent No.: US 6,813,939 B1
(45) Date of Patent: Nov. 9, 2004

(54) VEHICLE REPAIR RAMPS WITH INTEGRAL ROLLING SYSTEM

(76) Inventor: Laray A. Wilcoxon, 930 Trosper Rd., SW -SP-22, Tumwater, WA (US) 98512

( * ) Notice: Subject to any disclaimer, the term of this patent is extended or adjusted under 35 U.S.C. 154(b) by 86 days.

(21) Appl. No.: 10/178,453

(22) Filed: Jun. 24, 2002

(51) Int. Cl.[7] .............................................. G01M 17/02
(52) U.S. Cl. .......................................................... 73/146
(58) Field of Search ................................ 73/146–146.8

(56) References Cited

U.S. PATENT DOCUMENTS

| | | | |
|---|---|---|---|
| 3,554,023 A | | 1/1971 | Gelil |
| 4,266,482 A | | 5/1981 | Barber |
| 4,576,098 A | | 3/1986 | Belanger et al. |
| 5,154,076 A | | 10/1992 | Wilson et al. |
| 5,193,386 A | | 3/1993 | Hesse, Jr. et al. |
| 5,429,004 A | | 7/1995 | Cruickshank |
| 6,101,953 A | * | 8/2000 | Spata .................. 105/215.2 |
| 6,247,357 B1 | | 6/2001 | Clayton, Jr. et al. |
| 6,257,054 B1 | | 7/2001 | Rostkowski et al. |

FOREIGN PATENT DOCUMENTS

GB         2201385 A   *   9/1988   .......... B60K/25/08

* cited by examiner

Primary Examiner—Edward Lefkowitz
Assistant Examiner—Jermaine Jenkins
(74) Attorney, Agent, or Firm—John D. Gugliotta; Olen L. York, III

(57) ABSTRACT

A pair of car ramps is provided, each with integral rollers that allow the drive wheels of a vehicle to turn while the vehicle remains stationary. Each ramp is a two-piece unit with a removable inclined section and a separate recessed wheel section. This feature allows the units to store easily as well as aiding in transportation. Additionally, the recessed wheel section is lined with a series of rollers with bearings. These rollers are what allows the drive wheels to turn, while the vehicle remains stationary. The rollers are also provided with a locking mechanism that prevents the rollers from moving to allow the vehicle to drive on and off the invention. A separate but stationary roller prevents the tire from overshooting the recessed rollers. All surfaces that contact grade are covered with rubber protectors to prevent damage.

6 Claims, 3 Drawing Sheets

VEHICLE REPAIR RAMPS WITH INTEGRAL ROLLING SYSTEM

RELATED APPLICATIONS

The present invention was first described in Disclosure Document Registration 500,879 filed on Oct. 5, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to vehicle repair ramps. More specifically, the present invention relates to vehicle repair ramps with an integral rolling system.

2. Description of the Related Art

While the modem motor vehicle is generally a reliable and robust machine, it is not without its repair headaches. Many of these headaches originate from problems that occur while driving, but cannot be duplicated in the shop, such as drive train or suspension problems. Even if the vehicle is completely off of the ground, either by a lift, or by multiple jacks or jack stands, the problem may not be duplicated, since the wheels are free spinning and not under any load. While large repair shops or dealerships may have a dynamometer type test stand to allow the vehicle to operate under load, it is generally too expensive to be used by smaller repair shops or do-it-yourselfers.

A search of the prior art did not disclose any patents that read directly on the claims of the instant invention; however, the following references were considered related.

U.S. Pat. No. 6,257,054 issued in the name of Rostkowski et al., describes a roller dynamometer having at least one supporting carriage having a rotatable roller and dynamometer.

U.S. Pat. No. 6,247,357 issued in the name of Clayton Jr. et al., describes a chassis dynamometer including a frame, a roll set for engaging wheels and an eddy current braker/inertia simulating unit.

U.S. Pat. No. 5,429,004 issued in the name of Cruickshank, describes an inertia flywheel assembly for a dynamometer which is portable.

U.S. Pat. No. 5,193,386 issued in the name of Hesse Jr. et al., describes an apparatus for retaining contact of a wheel having a first and second sidewall.

U.S. Pat. No. 5,154,076 issued in the name of Wilson et al., describes a dynamometer for simulating the inertia and road load forces for motor vehicles.

U.S. Pat. No. 4,576,098 issued in the name of Belanger et al., describes a power operated elevator ramp for use in an automobile conveyor.

U.S. Pat. No. 4,266,482 issued in the name of Barber, describes a selectable dolly vehicle conveyor system.

U.S. Pat. No. 3,554,023 issued in the name of Geul, describes a roller testing stand for motor vehicles.

Consequently, there exists a need for a cost-effective means by which the drive wheels of a motor vehicle can be operated while the vehicle remains stationary for diagnostic purposes.

SUMMARY OF THE INVENTION

It is therefore an object of the present invention to include vehicle supports and drivetrain testing devices in combination.

It is a feature of the present invention around a portable vehicle ramp that can accommodate vehicle fire rotation.

Briefly described according to one embodiment of the present invention, a pair of car ramps is provided, each with integral rollers that allow the drive wheels of a vehicle to turn while the vehicle remains stationary. Upon initial observation, the invention looks remarkably like a pair of conventional car ramps that are commonly used by do-it-yourselfers, with an inclined driving surface and a recessed wheel area. However, after closer inspection, it can be seen that each ramp is a two-piece unit with a removable inclined section and a separate recessed wheel section. This feature allows the units to store easily as well as aiding in transportation. Additionally, the recessed wheel section is lined with a series of rollers with bearings. These rollers are what allows the drive wheels to turn, while the vehicle remains stationary. The rollers are also provided with a locking mechanism that prevents the rollers from moving to allow the vehicle to drive on and off the invention. A separate but stationary roller prevents the tire from overshooting the recessed rollers. All surfaces that contact grade are covered with rubber protectors to prevent damage.

The use of the present invention provides professionals and do-it-yourselfers alike a powerful tool in diagnosing suspension and drive train problems on all types of motor vehicles.

An advantage of the present invention is that it functions like a pair of car ramps, but with rollers on top that aids in diagnosing motor vehicle problems that occur only when the wheels are turning and under load.

Another advantage of the present invention is that the can be used like regular ramps as well.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS.

1. Detailed Description of the FIGURES

Figure 1:
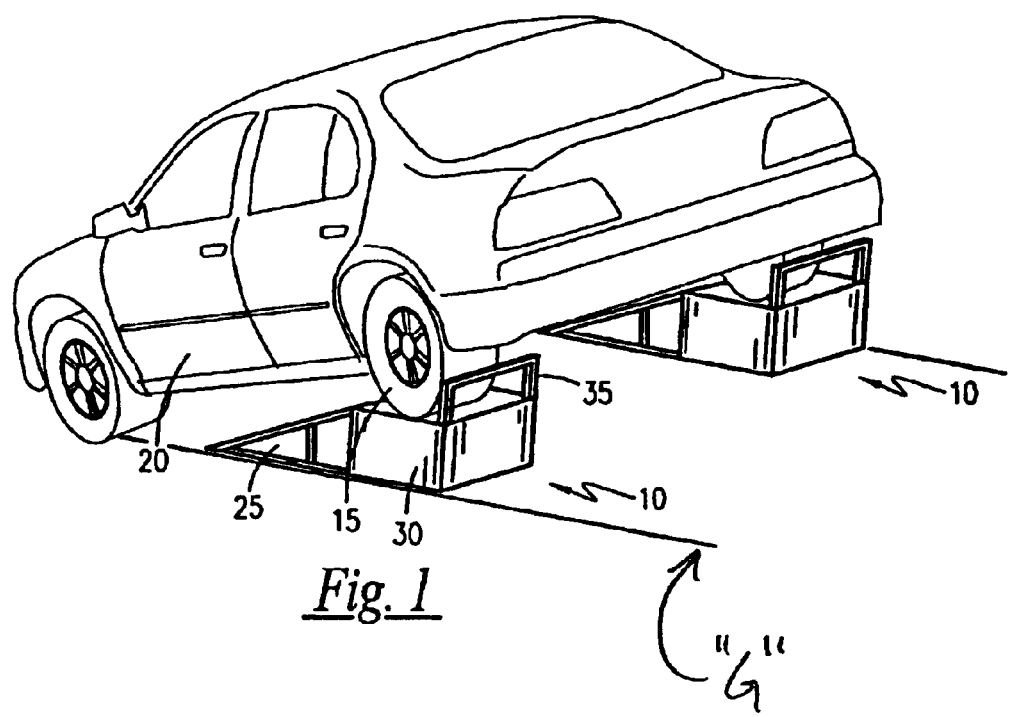
FIG. 1 is an isometric view of the vehicle repair ramps with an integral rolling system, shown in a utilized state, according to the preferred embodiment of the present invention.

Referring now to FIG. 1, an isometric view of the vehicle roller ramps with integral rolling system 10, shown in a utilized state, according to the preferred embodiment of the present invention. The vehicle roller ramps with integral rolling system 10, used in pairs as shown, are used on the drive wheels 15 of a motor vehicle 20. FIG. 1 depicts a front-wheel drive vehicle, as evidenced by the front wheels being the drive wheels 15, but it should be noted that the vehicle roller ramps with integral rolling system 10 could be equally effectively used on rear-wheel drive vehicles as well. Each vehicle roller ramp with integral rolling system 10 consists of a ramp unit 25 and a roller unit 30. The ramp unit 25 is used to allow the motor vehicle 20 to be driven up onto the roller unit 30. The ramp unit 25 is mechanically connected to the roller unit 30 as will be described herein below. Once the motor vehicle 20 is in place on the roller unit 30 as shown, the ramp unit 25 can be removed to allow access to the underside of the motor vehicle 20. At the front edge of the roller unit 30, a stop roller 35 is provided to prohibit the motor vehicle 20 from driving off of the front edge of the roller unit 30. The stop roller 35 allows rotation of the drive wheels 15 against its surface, but does not allow forward movement of the drive wheels 15 or its associated motor vehicle 20. The motor vehicle 20 gains access to the pair of vehicle roller ramps with integral rolling system 10 in much the same manner that conventional motor vehicle repair ramps are utilized. The vehicle roller ramps with integral rolling system 10 are spaced apart on a hard surface such as concrete, such that their spacing corresponds with the spacing or stance of the drive wheels 15. Next the motor vehicle 20 engages the ramps by simply driving up the ramp unit 25 and stopping on the roller unit 30.

Figure 2:
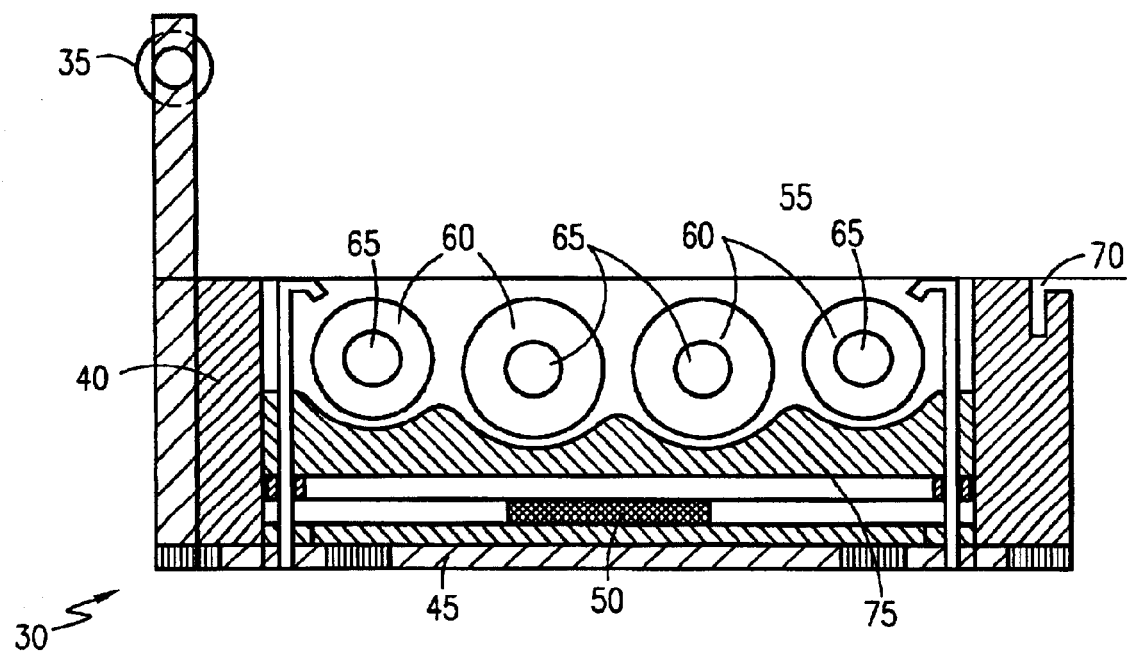
FIG. 2 is a side view of the roller unit as used with the vehicle repair ramps with an integral rolling system.

Referring next to FIG. 2, a side view of the roller unit 30 as used with the vehicle roller ramps with integral rolling system 10, is disclosed. An overall frame 40 holds a fist base 45 and a handle 50. The first base 45 is in direct contact with the grade "G" and the handle 50 allows for ease of carrying and transportation. A roller holder 55 located on the top of the overall frame 40 holds a series of four rollers 60 each supported by a respective high speed bearing 65. The rollers 60 are in direct physical contact with the drive wheels 15 (as shown in FIG. 1) and allow the motor vehicle 20 (as shown in FIG. 1) to be analyzed while operating under load, yet not be in motion. A connection protrusion 70 allows for the connection of the ramp unit 25 (as shown in FIG. 1) as will be described in greater detail herein below. A restraint shoe 75, whose operation and movement will also be described herein below, is used to immobilize the rollers 60 when the motor vehicle 20 (as shown in FIG. 1) is driven on and off the vehicle roller ramps with integral rolling system 10. Additionally, with the restraint shoe 75 engaged against the rollers 60, the vehicle roller ramps with integral rolling system 10 Can be used like conventional car ramps. The spacing and configuration of the rollers 60 are such that drive wheels 15 (as shown in FIG. 1) of virtually any radius can utilize them. On smaller radius tires, only the center rollers 60 will be engaged. On larger radius tires, all rollers 60 will be engaged. Finally, the stop roller 35, provides additionally protection against over traveling the roller unit 30, by providing a hard stop against the drive wheels 15 (as shown in FIG. 1).

Figure 3:
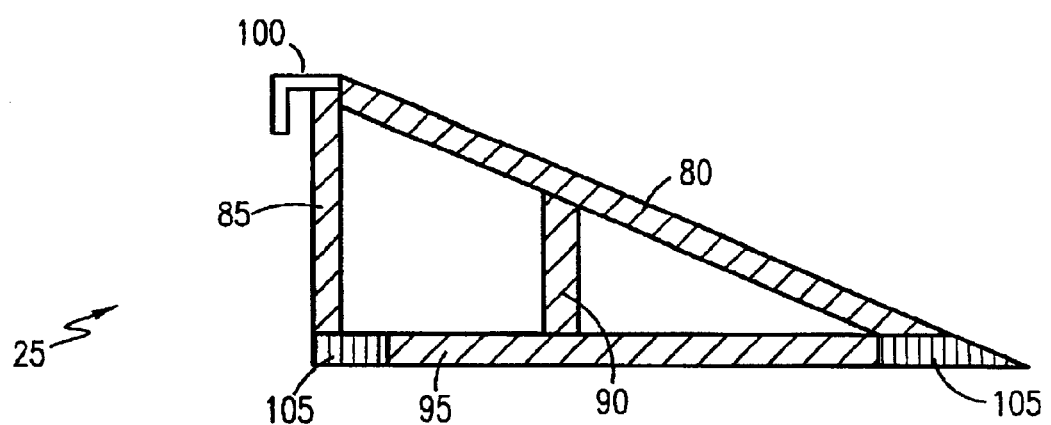
FIG. 3 is a side view of the ramp unit as used with the vehicle repair ramps with an integral rolling system.

Referring now to FIG. 3, a side view of the ramp unit 25 as used with the vehicle roller ramps with integral rolling system 10 is depicted. An inclined surface 80 is supported by a first vertical support member 85 and a second vertical support member 90. The opposite ends of the first vertical support member 85 and the second vertical support member 90 connect to a second base 95, which rests upon grade. A connection hook 100, located at the upper end of the first vertical support member 85 mates to the connection protrusion 70 (as shown in FIG. 2). Such a connection is easy to make by simply hooking the connection hook 100 over the connection protrusion 70 (as shown in FIG. 2) and physically placing it close proximity. Such a connection is also easy to remove once the motor vehicle 20 (as shown in FIG. 1) is in place on the roller unit 30 (as shown in g FIG. 1) and access to the underside of the motor vehicle 20, immediately near the roller unit 30, is required. A series of protector fittings 105 is provided along the outer edge of the ramp unit 25 for multiple reasons. First, since it is envisioned that the protector fittings 105 is to be made of a material such a shard rubber, the protector fittings 105 will provided protection against damaging of the grade or pavement, the ramp unit 25 is placed upon. Secondly, the physical nature of the protector fittings 105 will not slip and slide when accessing or leaving the ramp unit 25. Finally, the protector fittings 105 reduces the noise level associated with the motor vehicle 20 (as shown on FIG. 1) when accessing or leaving the ramp unit 25. The overall configuration of the ramp unit 25, and its reduced slope allow easy access for all vehicles, regardless of vehicle horsepower.

Figure 4:
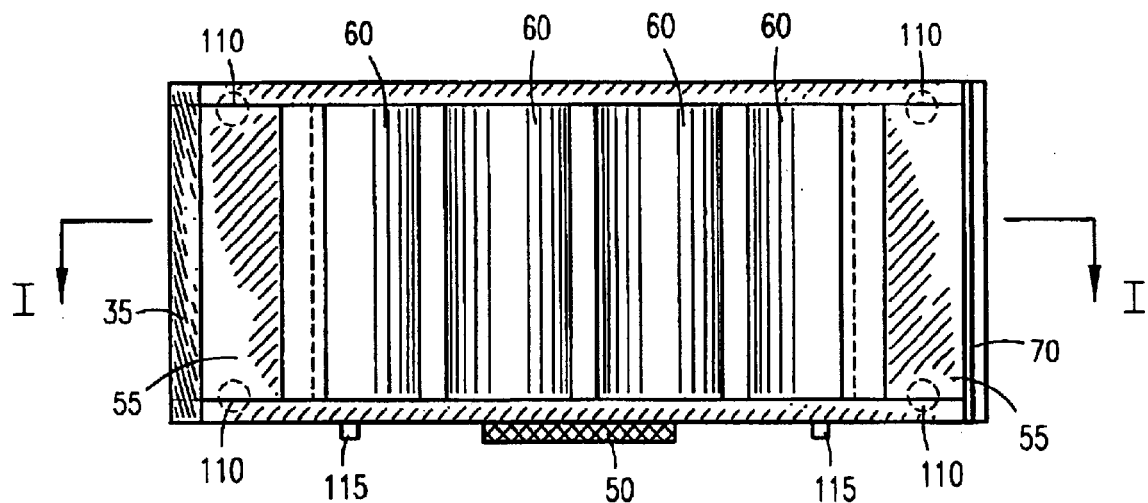
FIG. 4 is a top view of the roller section as used with the vehicle repair ramps with an integral rolling system.

Referring next to FIG. 4, a top view of the roller unit 30 as used with the vehicle roller ramps with integral rolling system 10 is disclosed. The rollers 60 in conjunction with the roller holder 55 provide the planar surface upon which the drive wheels 15 (as shown in FIG. 1) rest. A series of four connection points 110, envisioned to be threaded inserts, such as nuts, welded into place provide the means of fastening the components of the roller unit 30 together. The stop roller 35 is provided in a parallel placement to restrict the drive wheels 15 in forward, but not rotational movement. The connection protrusion 70, shown along the right side, is more clearly visible in this FIG., as a slot configuration. The handle 50 is shown along the bottom. Two locking restraint handles 115, for the purposes of engaging the restraint shoe 75 (as shown in FIG. 2) are provided, and will be described in greater detail herein below.

Figure 5:
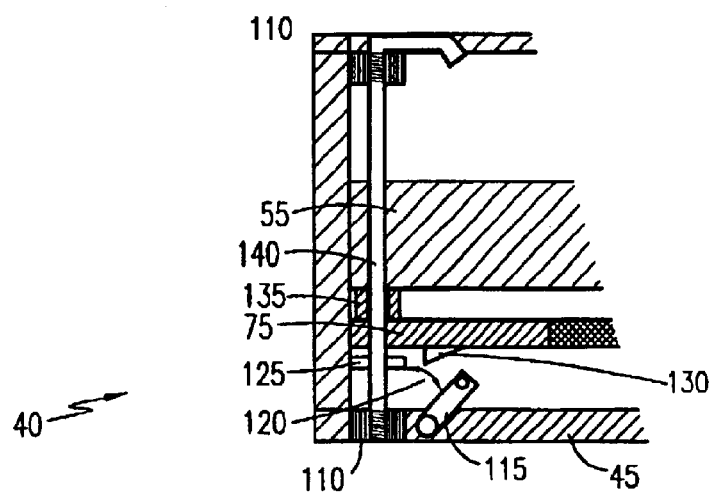
FIG. 5 is a sectional view of the roller section as used with the vehicle repair ramps with an integral rolling system as seen along a line I—I as shown in FIG. 4.

Referring finally to FIG. 5, a sectional view of the overall frame 40 as seen along a line I—I, as shown in FIG. 4 is shown. The locking restraint handles 115 (of which only one is shown here for sake of clarity), travels along a path as depicted by a travel path 120. In its lower or horizontal position, it lays against the first base 45. In its upper or vertical position, the locking restraint handles 115 is held in place by a stop 125 and a restraint nub 130. Additionally, in this position, it acts against and compresses a spring 135. The spring 135 is mounted on a connecting shaft 140 and is free to move about along with the restraint shoe 75. Thus, with the spring 135 compressed, the restraint shoe 75 can be pressed against the rollers 60, thus immobilizing them. The connecting shaft 140 is physically connected to the connection points 110 at both ends. This description is typical for all four corners of the overall frame 40 and is depicted here as a singular unit for purposes of clarity.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The present invention is designed with ease of operation features in mind that allow it to be utilized by a common user with little or no training or experience in a transparent manner. After acquisition of a pair of vehicle roller ramps with integral rolling system 10, the set of ramp units 25 are joined to the set of roller units 30. They are then set upon a load-bearing grade surface such as concrete, a set distance apart to match the distance of the drive wheels 15 spacing on the motor vehicle 20. Next, it is ensured that the restraint shoe 75 is engaged against the rollers 60 by placing of the locking restraint handles 115 against the restraint shoe 75 and locking them in place with the aid of the restraint nub 130. This action is repeated for each pair of locking restraint handles 115 on each roller unit 30. At this point, the pair of vehicle roller ramps with integral rolling system 10 is ready to receive the motor vehicle 20 under test.

The motor vehicle 20 is carefully and slowly driven up the ramp unit 25 and onto the roller unit 30. It is envisioned that another person would indicate to the driver when the vehicle has traveled a sufficient distance, but if one is not available, the stop roller 35 would engage the drive wheels 15 of the motor vehicle 20 to indicate that the drive wheels 15 of the motor vehicle 20 is engaged with the rollers 60 of the roller unit 30. The motor vehicle 20 is then immobilized, and the opposite set of wheels not engaged with the vehicle roller ramps with integral rolling system 10 would also be immobilized with the aid of a restraining device such as wheel chocks. After another check to see that the drive wheels are centered and engaged upon the rollers 60, the restraint shoe 75 is released by placing the two locking restraint handles 115 on each roller unit 30 in the horizontal position. At this point the motor vehicle 20 can be operated in a driving configuration to evaluate operation and any possible malfunction of the motor vehicle 20 under load conditions.

After the evaluation of the motor vehicle 20 is complete, the locking restraint handles 115 are again placed in the vertical position to allow engagement of the restraint shoe 75 with the rollers 60 to immobilize them and allow the motor vehicle 20 to be driven back off of the vehicle roller ramps with integral rolling system 10. At this point in time, the utilization of the vehicle roller ramps with integral rolling system 10 is complete.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. A portable vehicle ramp comprising:
    a ramp unit; and
    a roller unit mateably impinged with said ramp unit to position said ramp unit and said roller unit adjacently;
    an elevated stop roller affixed to a front edge of said roller unit to prohibit a motor vehicle from driving off of said front edge of said roller unit, and wherein said stop roller allows rotation of the drive wheels against a surface, but does not allow forward movement of the drive wheels or its associated motor vehicle;
    wherein said ramp unit is used to allow a motor vehicle to be driven up onto said roller unit, said ramp is removable after a tire is positioned on said roller unit, removal of said ramp providing access to an underside of said vehicle.

2. The portable vehicle ramp of claim 1, wherein said roller unit comprises:
    an overall frame that holds a first base, said first base in direct contact with grade;
    a handle affixed to said frame;
    a roller holder located on a top of the overall frame for supporting a series of four rollers, each said roller supported by a respective high speed bearing, said rollers accommodating varying diameters of tires;
    wherein when said rollers are in direct physical contact with the drive wheels it allows a motor vehicle to be analyzed while operating under load, yet not be in motion.

3. The portable vehicle ramp of claim 2, further comprising:
    a connection protrusion extending from said overall frame for mateable impingement of said ramp unit; and
    restraint shoe to immobilize the rollers for use when the motor vehicle is driven on and off the vehicle roller ramps, said restraint shoe urged upward by a locking handle, said restraint shoe engaging said rollers to prevent rotation of said rollers.

4. A portable vehicle ramp comprising:
    a ramp unit having an inclined surface supported by a first vertical support member and a second vertical support member, wherein opposite ends of said first vertical support member and said second vertical support member connect to a second base, which rests upon grade; and
    a connection hook located at an upper end of the first vertical support member;
    a roller unit mateably impinged with said ramp unit to position said ramp unit and said roller unit adjacently;
    wherein said ramp unit is used to allow a motor vehicle to be driven up onto said roller unit, said ramp is removable after a tire is positioned on said roller unit, removal of said ramp providing access to an underside of said vehicle.

5. The portable vehicle ramp of claim 4, wherein said roller unit comprises:
    an overall frame that holds a first base, said first base in direct contact with grade;
    a handle affixed to said frame;
    a roller holder located on a top of the overall frame for supporting a series of four rollers, each said roller supported by a respective high speed bearing, said rollers accommodating varying diameters of tires;
    wherein when said rollers are in direct physical contact with the drive wheels it allows a motor vehicle to be analyzed while operating under load, yet not be in motion.

6. The portable vehicle ramp of claim 5, further comprising:
    a connection protrusion extending from said overall frame for mateable impingement of said ramp unit; and
    restraint shoe to immobilize the rollers for use when the motor vehicle is driven on and off the vehicle roller ramps, said restraint shoe urged upward by a locking handle, said restraint shoe engaging said rollers to prevent rotation of said rollers.

* * * * *